(12) United States Patent  
Vandwalle et al.

(10) Patent No.: US 8,917,709 B2
(45) Date of Patent: Dec. 23, 2014

(54) SCHEDULED ABSENCE ON A WIRELESS LOCAL AREA NETWORK

(71) Applicant: Apple Inc., Cupertino, CA (US)

(72) Inventors: Pierre B. Vandwalle, San Francisco, CA (US); Robert J. Stacey, Portland, OR (US)

(*) Notice: Subject to any disclaimer, the term of this patent is extended or adjusted under 35 U.S.C. 154(b) by 120 days.

(21) Appl. No.: 13/773,573

(22) Filed: Feb. 21, 2013

(65) Prior Publication Data

US 2014/0233467 A1    Aug. 21, 2014

(51) Int. Cl.
*H04W 4/00* (2009.01)
*H04W 72/12* (2009.01)

(52) U.S. Cl.
CPC ..................... *H04W 72/12* (2013.01)
USPC ........................................................ 370/338

(58) Field of Classification Search
None
See application file for complete search history.

(56) References Cited

U.S. PATENT DOCUMENTS

| | | | |
|---|---|---|---|
| 8,045,494 B2* | 10/2011 | Habetha et al. | 370/311 |
| 8,116,319 B2* | 2/2012 | Yoon et al. | 370/395.5 |
| 2005/0190709 A1 | 9/2005 | Ferchland et al. | |
| 2007/0160003 A1* | 7/2007 | Meier | 370/329 |
| 2009/0274121 A1 | 11/2009 | Bertorelle et al. | |
| 2010/0009725 A1* | 1/2010 | Banerjea | 455/574 |
| 2010/0278065 A1 | 11/2010 | Sun et al. | |
| 2011/0002253 A1* | 1/2011 | Cha et al. | 370/311 |
| 2011/0090877 A1 | 4/2011 | Yuan | |
| 2011/0103277 A1 | 5/2011 | Watfa et al. | |
| 2011/0188391 A1 | 8/2011 | Sella et al. | |
| 2012/0195227 A1 | 8/2012 | Vedantham et al. | |
| 2013/0028156 A1 | 1/2013 | Vedantham et al. | |

FOREIGN PATENT DOCUMENTS

WO    WO2005086428    9/2005
WO    2012/149425 A1    11/2012

OTHER PUBLICATIONS

PCT Application No. PCT/US2013/073953—International Search Report & Written Opinion dated Mar. 24, 2014.

* cited by examiner

*Primary Examiner* — Brian Roberts
(74) *Attorney, Agent, or Firm* — Womble Carlyle Sandridge & Rice, LLP

(57) ABSTRACT

A method for scheduling absence periods on a WLAN is provided. The method can include a WLAN station joining a WLAN served by a WLAN access point using an operating channel; formatting a message defining an absence schedule of absence periods during which the WLAN station will be off of the operating channel and unavailable to receive traffic on the operating channel; sending the message to the WLAN access point to register the absence schedule with the WLAN access point; and leaving and returning to the operating channel in accordance with the absence schedule after the absence schedule has been registered with the WLAN access point.

23 Claims, 10 Drawing Sheets

| Schedule Start Time 402 | Absence Period Duration 404 | Absence Period Interval 406 |

SCHEDULED ABSENCE ON A WIRELESS LOCAL AREA NETWORK

FIELD OF THE DESCRIBED EMBODIMENTS

The described embodiments relate generally to wireless communications and, more particularly, to scheduling absence periods on a wireless local area network (WLAN).

BACKGROUND

A station on a WLAN needs to periodically leave an operating channel used by the access point for the WLAN to scan for other devices. In so doing, the WLAN station can switch to another channel for a short amount of time and then return to the operating channel, resulting in an absence period during which the WLAN station is absent from the operating channel. In order to avoid data loss, the WLAN station must inform the access point of its absence from the operating channel so that the access point does send not data to the WLAN station on the operating channel during the absence period.

In present WLANs, a station can inform the access point in advance of each absence period by setting a power management (PM) bit in a data frame sent to the access point. The WLAN station can then wait to receive an acknowledgement from the access point and, after receiving the acknowledgement, can wait for an additional period to allow the access point to register the station's new mode before leaving the channel. After completing the scan, the station can return to the operating channel and send another data frame with the PM bit set to 0 to the access point to inform the access point that the station has returned to the operating channel. In this regard, present WLAN stations inform WLAN access points in advance of leaving for each absence period with a first message and upon returning from each absence period with a second message.

The overhead involved in the station informing the access point of leaving for and returning from an absence period can be burdensome to both the WLAN station and access point. Further, the signaling involved can consume over-the-air interface resources that can impact other devices on the WLAN. In many instances, the time needed for notifying the access point and waiting for an acknowledgement in advance of each absence period can be as long as, or even longer than the actual absence. As such, present methodologies in which a station notifies an access point in advance of leaving for and upon returning from each individual absence period are inefficient and overhead intensive.

SUMMARY OF THE DESCRIBED EMBODIMENTS

Some embodiments disclosed herein provide for scheduled absence on a WLAN. More particularly, a WLAN station in accordance with some example embodiments can be configured to send a message to a WLAN access point indicating when the WLAN station will be off of the operating channel. In this regard, the message of some example embodiments can define an absence schedule of absence periods during which the WLAN station will be off of the operating channel and unavailable to receive traffic on the operating channel. The WLAN station of such embodiments can then leave and return to the operating channel in accordance with the absence schedule without providing further notifications to the WLAN access point. As such, overhead can be significantly reduced through registering an absence schedule with the WLAN access point in accordance with various example embodiments without the WLAN station having to separately notify the access point when leaving for and returning from each individual absence period.

In a first example embodiment, a method is provided, which can include a WLAN station joining a WLAN served by a WLAN access point using an operating channel; formatting a message defining an absence schedule of absence periods during which the WLAN station will be off of the operating channel and unavailable to receive traffic on the operating channel; sending the message to the WLAN access point to register the absence schedule with the WLAN access point; and leaving and returning to the operating channel in accordance with the absence schedule after the absence schedule has been registered with the WLAN access point.

In a second example embodiment, an apparatus is provided, which can include a communication interface and processing circuitry that can be coupled to the communication interface. The communication interface can be configured to enable the apparatus to send data to and receive data from a WLAN. The processing circuitry can be configured to control the apparatus of the second embodiment to at least join a WLAN served by a WLAN access point using an operating channel; format a message defining an absence schedule of absence periods during which the apparatus will be off of the operating channel and unavailable to receive traffic on the operating channel; send the message to the WLAN access point to register the absence schedule with the WLAN access point; and leave and return to the operating channel in accordance with the absence schedule after the absence schedule has been registered with the WLAN access point.

In a third example embodiment, a computer program product is provided. The computer program product of the third embodiment can include at least one non-transitory computer readable storage medium having program code stored thereon. The program code of the third embodiment can include program code for controlling a WLAN station to join a WLAN served by a WLAN access point using an operating channel; program code for formatting a message defining an absence schedule of absence periods during which the WLAN station will be off of the operating channel and unavailable to receive traffic on the operating channel; program code for controlling the WLAN station to send the message to the WLAN access point to register the absence schedule with the WLAN access point; and program code for controlling the WLAN station to leave and return to the operating channel in accordance with the absence schedule after the absence schedule has been registered with the WLAN access point.

In a fourth example embodiment, an apparatus is provided, which can include means for joining a WLAN served by a WLAN access point using an operating channel; means for formatting a message defining an absence schedule of absence periods during which the apparatus will be off of the operating channel and unavailable to receive traffic on the operating channel; means for sending the message to the WLAN access point to register the absence schedule with the WLAN access point; and means for leaving and returning to the operating channel in accordance with the absence schedule after the absence schedule has been registered with the WLAN access point.

In a fifth example embodiment, a method is provided, which can include a WLAN access point receiving a message from a WLAN station defining an absence schedule of absence periods during which the WLAN station will be off of an operating channel used by the WLAN access point and unavailable to receive traffic on the operating channel; buffering traffic to be sent to the WLAN station during an absence period defined by the absence schedule; and sending buffered traffic to the WLAN station after conclusion of the absence period.

In a sixth example embodiment, an apparatus is provided, which can include a communication interface and processing circuitry that can be coupled to the communication interface. The communication interface can be configured to enable the apparatus to send data to and receive data from a WLAN. The processing circuitry can be configured to control the apparatus of the sixth embodiment to at least use an operating channel to serve as a WLAN access point for the WLAN; receive a message from a WLAN station defining an absence schedule of absence periods during which the WLAN station will be off of the operating channel and unavailable to receive traffic on the operating channel; buffer traffic to be sent to the WLAN station during an absence period defined by the absence schedule; and send buffered traffic to the WLAN station after conclusion of the absence period.

In a seventh example embodiment, a computer program product is provided. The computer program product of the seventh embodiment can include at least one non-transitory computer readable storage medium having program code stored thereon. The program code of the seventh embodiment can include program code for receiving a message from a WLAN station defining an absence schedule of absence periods during which the WLAN station will be off of an operating channel used by the WLAN access point and unavailable to receive traffic on the operating channel; program code for buffering traffic to be sent to the WLAN station during an absence period defined by the absence schedule; and program code for sending buffered traffic to the WLAN station after conclusion of the absence period.

In an eighth example embodiment, an apparatus is provided, which can include means for receiving a message from a WLAN station defining an absence schedule of absence periods during which the WLAN station will be off of an operating channel used by the WLAN access point and unavailable to receive traffic on the operating channel; means for buffering traffic to be sent to the WLAN station during an absence period defined by the absence schedule; and means for sending buffered traffic to the WLAN station after conclusion of the absence period.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIG. 4 illustrates an example information element that can be inserted into a message for scheduling absence periods in accordance with some example embodiments.

DETAILED DESCRIPTION OF SELECTED EMBODIMENTS

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments address deficiencies in previous methodologies for handling absence notifications within WLANs. In this regard, some example embodiments provide for scheduled absence such that a WLAN station in accordance with such embodiments can register an absence schedule defining multiple absence periods during which the WLAN station will be off of the operating channel with the WLAN access point. A WLAN access point in accordance with such example embodiments can know when to buffer traffic for the WLAN station based on the registered absence schedule. Accordingly, various example embodiments reduce overhead by enabling a WLAN station to register a schedule of absence periods rather than separately notifying the WLAN access point of each individual absence period.

Figure 1:
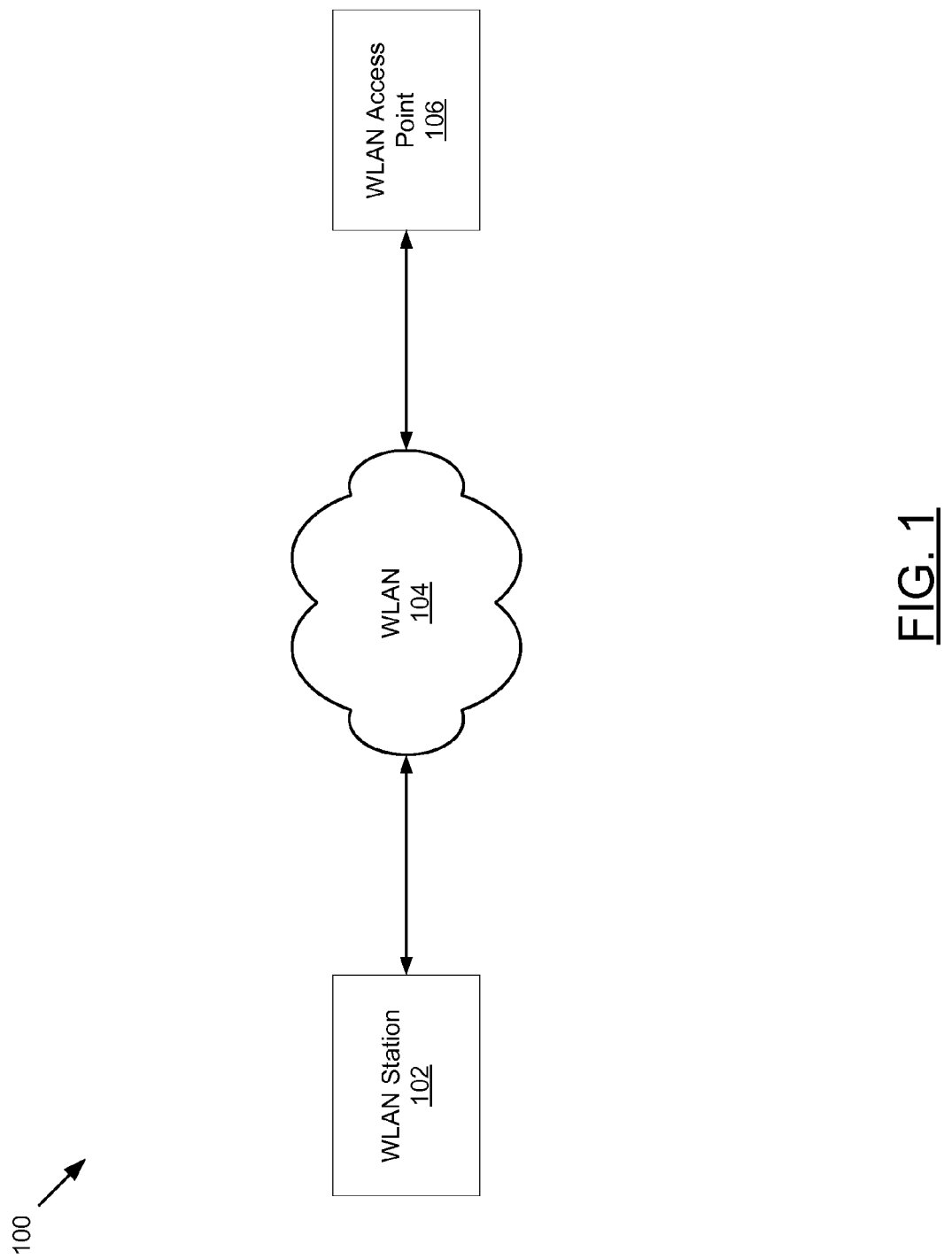
FIG. 1 illustrates a system in accordance with some example embodiments.

FIG. 1 illustrates a system 100 in accordance with some example embodiments. The system 100 can include a WLAN station 102. The WLAN station 102 can be any computing device that can communicate over a WLAN. By way of non-limiting example, the WLAN station 102 can be a cellular phone, such as a smart phone device, a tablet computing device, a laptop computing device, a desktop computing device, a television device, a media player, or other computing device that can be configured to operate within a WLAN.

In the example system 100, the WLAN station 102 can join the WLAN 104. The WLAN 104 can be served by a WLAN access point 106. The WLAN access point 106 can be any computing device that can be configured to serve as an access point for a WLAN. The WLAN 104 can use any networking protocol or standard that can be used for a WLAN. In some example embodiments, the WLAN 104 can be a network that can operate in accordance with an Institute of Electrical and Electronics Engineers (IEEE) 802.11 standard, including but not limited to 802.11a, 802.11b, 802.11g, 802.11n, and/or 802.11ac.

The WLAN access point 106 can use an operating channel for the WLAN 104. The WLAN station 102 can accordingly use this operating channel to connect to the WLAN 104. The WLAN station 102 can leave the operating channel for an absence period in order to scan another channel(s) for presence of other access points and/or stations. As will be described further herein below, the WLAN station 102 of some example embodiments can be configured to register an absence schedule with the WLAN access point 106. The WLAN access point 106 of some example embodiments can be configured to use the absence schedule to know when the WLAN station 102 will be off of the operating channel and can buffer data traffic for the WLAN station 102 during the scheduled absence periods.

Figure 2:
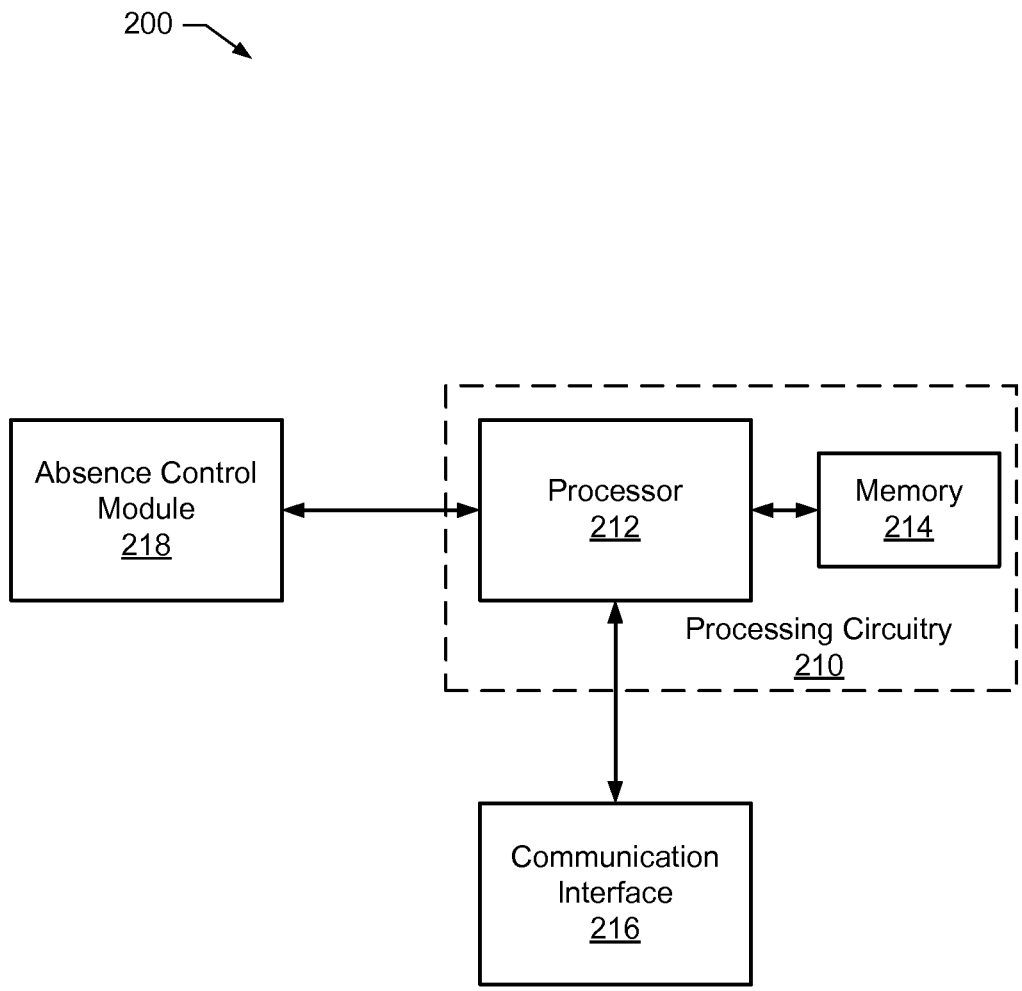
FIG. 2 illustrates a block diagram of an apparatus that can be implemented on a WLAN station in accordance with some example embodiments.

FIG. 2 illustrates a block diagram of an apparatus 200 that can be implemented on a WLAN station 102 in accordance with some example embodiments. In this regard, when implemented on a computing device, such as WLAN station 102, apparatus 200 can enable the computing device to operate within a WLAN, such as the WLAN 104, in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset including one or more chips. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate on a WLAN in accordance with one or more example embodiments.

In some example embodiments, the processing circuitry 210 can include a processor 212 and, in some embodiments, such as that illustrated in FIG. 2, can further include memory 214. The processing circuitry 210 can be in communication with or otherwise control the communication interface 216, and/or the absence control module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, communication interface 216, or absence control module 218 via a bus(es) for passing information among components of the apparatus 200.

The apparatus 200 can further include a communication interface 216. The communication interface 216 can include one or more interface mechanisms for enabling communication with other devices and/or networks. For example, the communication interface 216 can include a transceiver configured to enable the apparatus 200 to send wireless signals to and receive signals from a WLAN, such as the WLAN 104. The communication interface 216 can accordingly be configured in embodiments in which the apparatus 200 is implemented on the WLAN station 102 to enable the WLAN station 102 to send signals to and receive signals from the WLAN access point 106. In various example embodiments, the communication interface 216 can additionally or alternatively include, for example, an antenna (or multiple antennas) and supporting hardware and/or software for enabling communications with one or more further wireless communication networks, such as a cellular network, and/or a communication modem or other hardware/software for supporting communication via cable, digital subscriber line (DSL), USB, FireWire, Ethernet or other wireline networking methods.

The apparatus 200 can further include absence control module 218. The absence control module 218 can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the absence control module 218.

Figure 3:
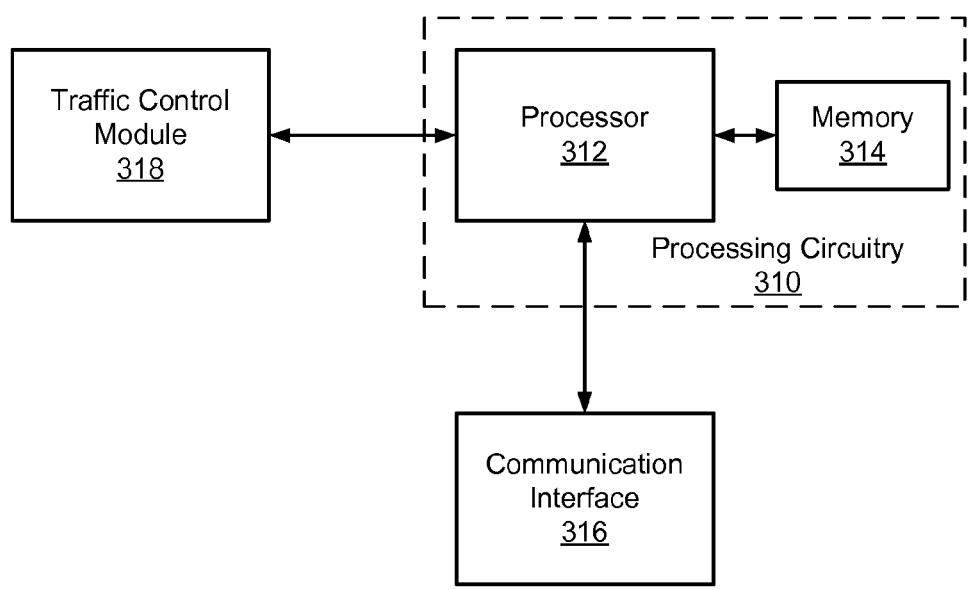
FIG. 3 illustrates a block diagram of an apparatus that can be implemented on a WLAN access point in accordance with some example embodiments.

FIG. 3 illustrates a block diagram of an apparatus 300 that can be implemented on a WLAN access point 106 in accordance with some example embodiments. In this regard, when implemented on a computing device, such as WLAN access point 106, apparatus 300 can enable the computing device to function as an access point for a WLAN, such as the WLAN 104, in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset including one or more chips. In some example embodiments in which one or more components of the apparatus 300 are embodied as a chipset, the chipset can be capable of enabling a computing device to function as a WLAN access point, such as the WLAN access point 106 in the system 100.

In some example embodiments, the processing circuitry 310 can include a processor 312 and, in some embodiments, such as that illustrated in FIG. 3, can further include memory 314. The processing circuitry 310 can be in communication with or otherwise control the communication interface 316, and/or the traffic control module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 can be capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, or traffic control module 318 via a bus(es) for passing information among components of the apparatus 300.

The apparatus 300 can further include a communication interface 316. The communication interface 316 can include one or more interface mechanisms for enabling communication with other devices and/or networks. For example, the communication interface 316 can include a transceiver configured to enable the apparatus 300 to send wireless signals to and receive signals from a WLAN, such as the WLAN 104. The communication interface 316 can accordingly be configured in embodiments in which the apparatus 300 is implemented on the WLAN access point 106 to enable the WLAN access point 106 to function as an access point for the WLAN 104 and to send signals to and receive signals from stations on the WLAN 104, such as the WLAN station 102. In various example embodiments, the communication interface 316 can additionally or alternatively include, for example, an antenna (or multiple antennas) and supporting hardware and/or software for enabling communications with one or more further wireless communication networks and/or a communication modem or other hardware/software for supporting communication via cable, digital subscriber line (DSL), USB, FireWire, Ethernet or other wireline networking methods.

The apparatus 300 can further include traffic control module 318. The traffic control module 318 can be embodied as various means, such as circuitry, hardware, a computer program product comprising a computer readable medium (for example, the memory 314) storing computer readable program instructions executable by a processing device (for example, the processor 312), or some combination thereof. In some embodiments, the processor 312 (or the processing circuitry 310) can include, or otherwise control the traffic control module 318.

The absence control module 218 can be configured in some example embodiments to format a message defining an absence schedule of absence periods during which the WLAN station 102 will be off of the operating channel used by the WLAN access point 106 and unable to receive traffic on the operating channel. In this regard, the absence schedule can define a schedule of when the WLAN station 102 will be off of the operating channel. The message, which can be referred to as a Schedule Add (SCHEDADD) Request message, can be any message which can include an information element defining the absence schedule. In some example embodiments, the message can be an action frame, management frame, or the like, which can include an information element defining the absence schedule.

In some example embodiments, the absence schedule can include a series of periodically occurring absence periods. In such example embodiments, the message can define a schedule start time at which a first absence period is scheduled to begin, an absence period duration, and a time interval between absence periods. The schedule start time can be defined in terms of an absolute start time, an interval from a time at which the message is generated and/or sent (e.g., an interval from a time stamp that can be included in the message in some embodiments), and/or other time definition that can be interpreted by the WLAN access point 106. In some example embodiments, the schedule start time can be defined in terms of a Timing Synchronization Function (TSF), or portion thereof, that can be known to the WLAN station 102 and WLAN access point 106. For example, the schedule start time can be defined based on the lower 4 bytes of the TSF. The absence period duration and the time interval between absence periods can each be defined in terms of any unit of time including, by way of non-limiting example, microseconds.

FIG. 4 illustrates an example information element that can be inserted into a message for scheduling absence periods in accordance with some example embodiments. In this regard, FIG. 4 illustrates an example information element that can define a series of periodically occurring absence periods. The information element can include a schedule start time field 402, which can define a time at which a first absence period is scheduled to begin. The information element can additionally include an absence period duration field 404, which can be used to define a duration of the absence periods. The information element can further include an absence period interval field 406, which can be used to define the time interval between absence periods. It will be appreciate that the information element illustrated in FIG. 4 is provided by way of example, and not by way of limitation. In some example embodiments, the fields of the information element can be in an order different from that illustrated in FIG. 4. Further, in some example embodiments, the information element can include additional and/or alternative fields to those illustrated in FIG. 4, and/or any of the fields shown in FIG. 4 may be omitted and/or considered optional.

In some example embodiments, the absence schedule can include aperiodically occurring absence periods. In such embodiments, the message defining the absence schedule can include an indication of a start time of each aperiodically occurring absence period. The start time indication of an aperiodically occurring absence period can, for example, be defined in terms of an absolute start time. Alternatively, the start time of an aperiodically occurring absence period can be defined relative to a previous absence period, such as in terms of an interval between respective absence periods. Additionally or alternatively, in some example embodiments, the absence schedule can include absence periods of non-uniform duration. For absence periods having a non-uniform duration, the message defining the absence schedule can include an indication of a duration of each respective absence period.

The WLAN station 102 can send the message defining the absence schedule to the WLAN access point 106 to register the schedule with the WLAN access point 106. After the absence schedule has been registered with the WLAN access point 106, the absence control module 218 can be configured to control the WLAN station 102 to leave and return to the operating channel in accordance with the absence schedule.

Figure 5:
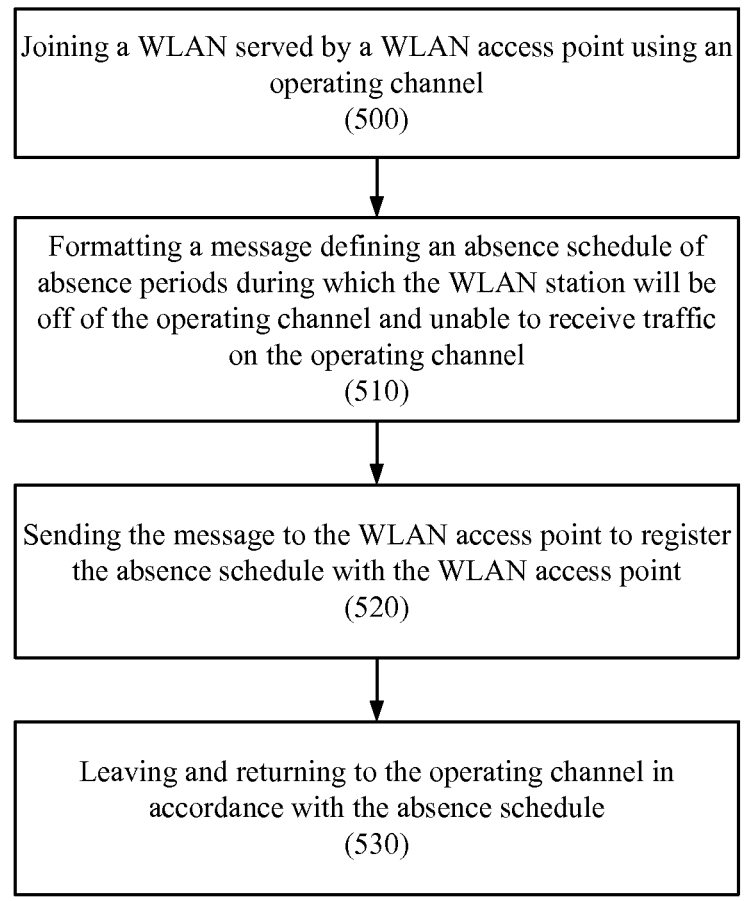
FIG. 5 illustrates a flowchart according to an example method for scheduling absence periods according to some example embodiments.

FIG. 5 illustrates a flowchart according to an example method for scheduling absence periods according to some example embodiments. In this regard, FIG. 5 illustrates operations that can be performed at a WLAN station, such as the WLAN station 102, in accordance with some example embodiments. One or more of the processing circuitry 210, processor 212, memory 214, communication interface 216, or absence control module 218 can, for example, provide means for performing the operations illustrated in FIG. 5. Operation 500 can include the WLAN station (e.g., the WLAN station 102) joining a WLAN (e.g., the WLAN 104) served by a WLAN access point (e.g., the WLAN access point 106) using an operating channel. Operation 510 can include the WLAN station formatting a message defining an absence schedule of absence periods during which the WLAN station will be off of the operating channel and unable to receive traffic on the operating channel. Operation 520 can include the WLAN station sending the message to the WLAN access point to register the absence schedule with the WLAN access point. Operation 530 can include the WLAN station leaving and returning to the operating channel in accordance with the absence schedule.

The WLAN access point 106 can receive a message defining an absence schedule that can be sent to the WLAN access point 106 by the WLAN station 102. The traffic control module 318 of some example embodiments can be configured to use the absence schedule to determine when to buffer traffic to be sent to the WLAN station 102. In this regard, traffic to be sent to the WLAN station 102 can be buffered during the absence periods so that traffic is not sent to the WLAN station 102 while it is off of the operating channel and unable to receive traffic on the operating channel. Based on the absence schedule, the traffic control module 318 can know the start time and ending time of each absence period and can accordingly know when to buffer traffic to hold until the WLAN station 102 has returned from an absence period.

In some example embodiments, the traffic control module 318 can begin to buffer traffic for the WLAN station 102 in advance of a scheduled start time of an absence period. The time at which the traffic control module 318 begins to buffer traffic for the WLAN station 102 in advance of a scheduled start time of an absence period can be chosen to avoid the potential of a frame, or portion thereof, being transmitted on the operating channel after the WLAN station 102 has already left the operating channel. Thus, for example, the traffic control module 318 can factor a network latency, a frame size, and/or other factor(s) in determining when to begin buffering traffic for the WLAN station 102. In some example embodiments, the traffic control module 318 can further factor a period of time to account for potential collisions and/or other factors that can impact a time needed to send a frame to the WLAN station 102 in determining when to begin buffering traffic in advance of an absence period.

After the conclusion of an absence period defined by a registered absence schedule, the traffic control module 318 can send any traffic that has been buffered for the WLAN station 102 during the absence period to the WLAN station 102. The WLAN station 102 can accordingly receive traffic that can be buffered by the WLAN access point 106 during an absence period after returning to the operating channel from the absence period. As such, the traffic control module 318 can use a registered absence schedule to buffer any traffic designated for the WLAN station 102 during an absence period and send any buffered traffic to the WLAN station 102 after the absence period without the WLAN station 102 needing to notify the WLAN access point 106 before leaving for and after returning from each absence period.

In some example embodiments, the traffic control module 318 can be further configured to use the absence schedule to define a frame size for traffic to be sent to the WLAN station 102. In this regard, if an absence period is upcoming, the traffic control module 318 can be configured to limit a frame size of a frame of traffic to be sent to the WLAN station 102 to a size that can allow the frame to be completely sent on the operating channel and received by the WLAN station 102 prior to the absence period.

Figure 6:
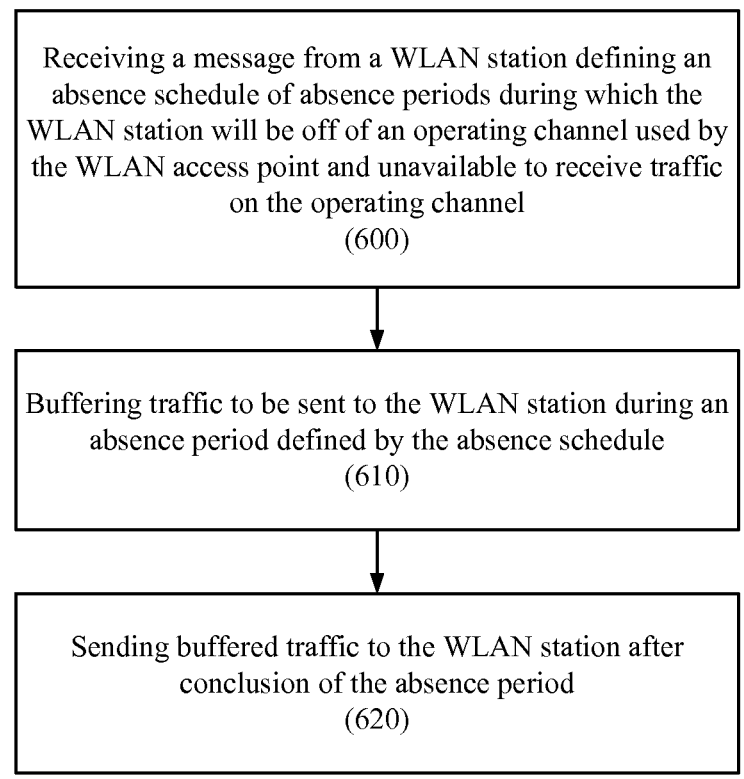
FIG. 6 illustrates a flowchart according to an example method for buffering traffic during scheduled absence periods according to some example embodiments.

FIG. 6 illustrates a flowchart according to an example method for buffering traffic during scheduled absence periods according to some example embodiments. In this regard, FIG. 6 illustrates operations that can be performed at a WLAN access point, such as the WLAN access point 106, in accordance with some example embodiments. One or more of the processing circuitry 310, processor 312, memory 314, communication interface 316, or traffic control module 318 can, for example, provide means for performing the operations illustrated in FIG. 6. Operation 600 can include a WLAN access point (e.g., the WLAN access point 106) receiving a message from a WLAN station (e.g., the WLAN station 102) defining an absence schedule of absence periods during which the WLAN station will be off of an operating channel used by the WLAN access point and unavailable to receive traffic on the operating channel. Operation 610 can include the WLAN access point buffering traffic to be sent to the WLAN station during an absence period defined by the absence schedule. Operation 620 can include the WLAN access point sending the buffered traffic to the WLAN station after conclusion of the absence period.

In some example embodiments, the absence control module 218 can be configured to send a message to the WLAN access point 106 canceling a registered absence schedule. For example, the WLAN station 102 can register an absence schedule defining a series of periodic absence periods without a defined termination point. As such, the absence control module 218 can send a message canceling the absence schedule when the WLAN station 102 no longer needs to engage in the regular absence periods to scan another channel(s), when the absence schedule is to be changed, and/or for other reason that can result in a termination or change to an existing registered absence schedule. For example, an absence schedule can be implemented by the WLAN station 102 while engaged in an activity, such as a video call, streaming video to or from the WLAN station 102, and/or other activity, for which the WLAN station can leave the operating channel for a series of absence periods to scan another channel(s). After conclusion of the activity, the WLAN station 102 may no longer need to leave the operating channel, and can cancel the absence schedule. The traffic control module 318 can accordingly be configured to cease buffering traffic for the WLAN station 102 in accordance with a cancelled absence schedule.

The traffic control module 318 of some example embodiments can be configured to send a response message, which can be referred to as a Schedule Add (SCHEDADD) Response message, to the WLAN station 102 in response to a message requesting to register an absence schedule (e.g., a SCHEDADD Request). The response message can indicate a registration status of the WLAN station's 102 request to register an absence schedule. In instances in which an absence schedule is successfully registered, the response message can provide an acknowledgement that the absence schedule was successfully registered. However, in instances in which an absence schedule is not successfully registered, the response message can indicate that the absence schedule was not successfully registered and, in some embodiments, can provide a status code indicative of a reason for the failure.

In some example embodiments, the absence control module 218 can be configured to expect a response to a request to register an absence schedule from the WLAN access point 106. In such embodiments, the absence control module 218 can wait to receive an acknowledgement that the absence schedule has been successfully registered before leaving the operating channel in accordance with the absence schedule without providing further notification to the WLAN access point 106. Thus, if a response is not received, or if a response indicating that the absence schedule was not successfully registered, the absence control module 218 can reattempt notifying the WLAN access point 106 of at least one absence period. In this regard, the absence control module 218 can send another message requesting to register the absence schedule and/or can send a message notifying the WLAN access point 106 that the WLAN station 102 is leaving the operating channel in advance of an absence period.

Figure 7:
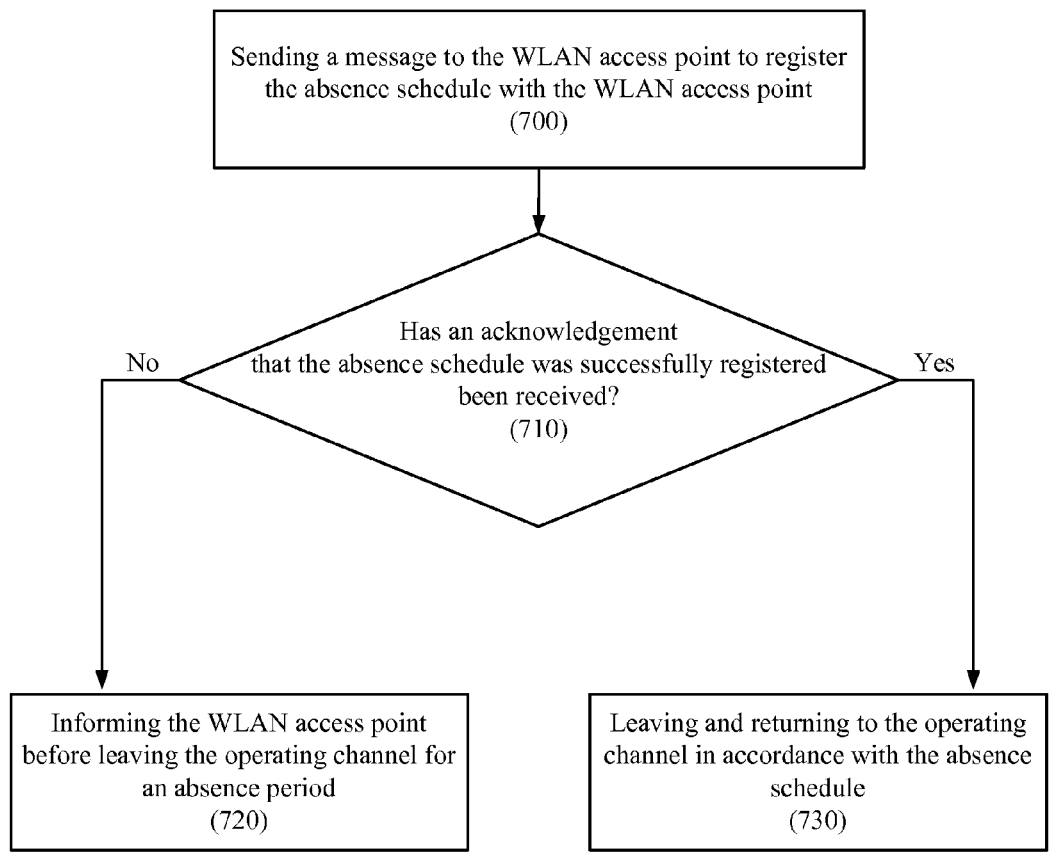
FIG. 7 illustrates a flowchart according to another example method for scheduling absence periods according to some example embodiments.

FIG. 7 illustrates a flowchart according to an example method for scheduling absence periods in which the WLAN station can expect a response to a message registering an absence period according to some example embodiments. In this regard, FIG. 7 illustrates operations that can be performed at a WLAN station, such as the WLAN station 102, in accordance with some example embodiments. One or more of the processing circuitry 210, processor 212, memory 214, communication interface 216, or absence control module 218 can, for example, provide means for performing the operations illustrated in FIG. 7. Operation 700 can include the WLAN station (e.g., the WLAN station 102) sending a message to the WLAN access point (e.g., the WLAN access point 106) to register the absence schedule with the WLAN access point. Operation 700 can, for example, correspond to operation 520 as illustrated in and described with respect to FIG. 5. Operation 710 can include the WLAN station determining whether an acknowledgement that the absence schedule was successfully registered has been received. In an instance in which it is determined that an acknowledgement has not been received (e.g., if no response was received, or if the response indicated a registration failure), the method can proceed to operation 720, which can include the WLAN station informing the WLAN access point before leaving the operating channel for an absence period. This can include sending another request to register the absence schedule, or can include sending a notification that the WLAN station is leaving the operating channel (e.g., notification of a single absence period) before leaving the operating channel for an absence period. Thus, within the context of the method of FIG. 5, in some example embodiments, operation 720 can be performed in lieu of operation 530 in an instance in which an acknowledgement is not received. If, however, it is determined at operation 710 that an acknowledgement has been received, the method can proceed to operation 730 rather than operation 720. Operation 730 can include the WLAN station leaving and returning to the operating channel in accordance with the absence schedule.

Figure 8:
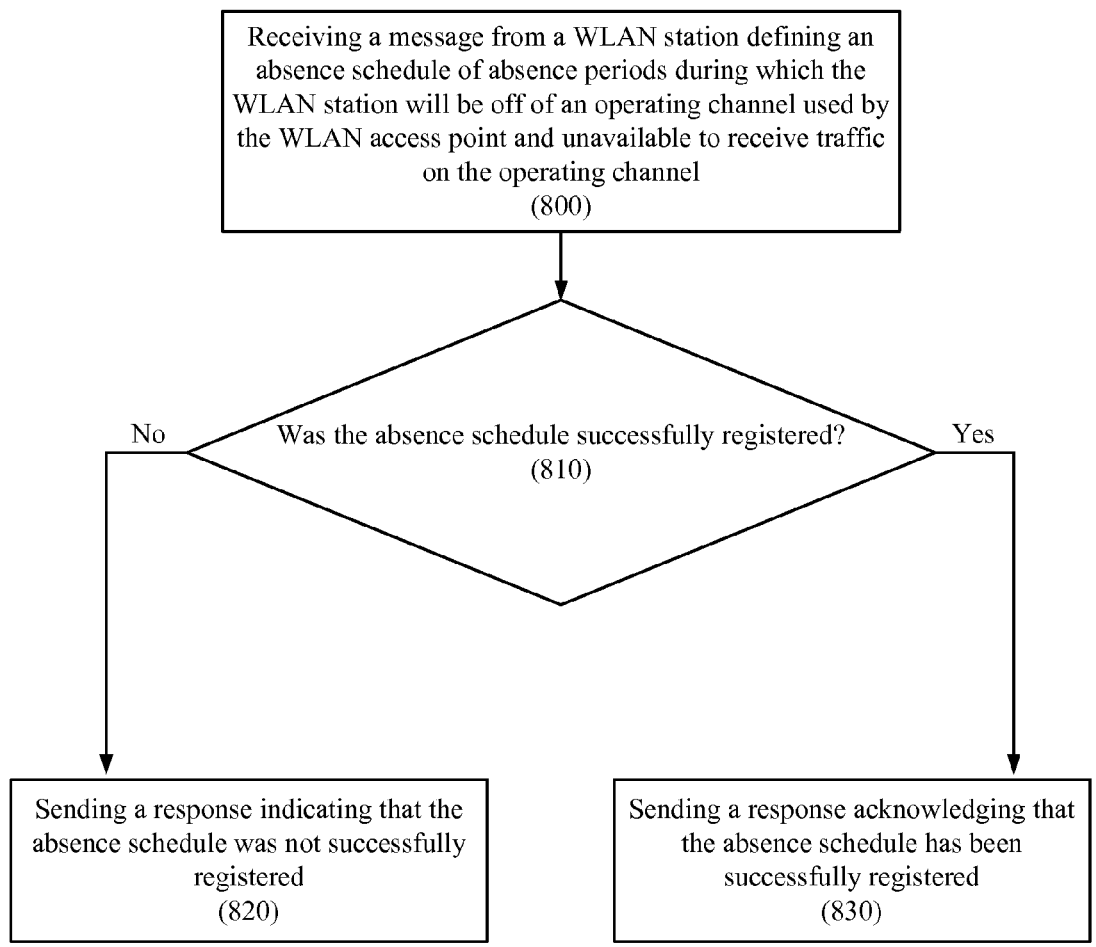
FIG. 8 illustrates a flowchart according to a further example method for scheduling absence periods according to some example embodiments.

FIG. 8 illustrates a flowchart according to an example method for scheduling absence periods in which the WLAN access point can send a response indicating a status of a registration request. In this regard, FIG. 8 illustrates operations that can be performed at a WLAN access point, such as the WLAN access point 106, in accordance with some example embodiments. One or more of the processing circuitry 310, processor 312, memory 314, communication interface 316, or traffic control module 318 can, for example, provide means for performing the operations illustrated in FIG. 8. Operation 800 can include a WLAN access point (e.g., the WLAN access point 106) receiving a message from a WLAN station (e.g., the WLAN station 102) defining an absence schedule of absence periods during which the WLAN station will be off of an operating channel used by the WLAN access point and unavailable to receive traffic on the operating channel. If the absence schedule is not successfully registered (operation 810), the method can proceed to operation 820, which can include the WLAN access point sending a response indicating that the absence schedule was not successfully registered. If, however, the absence schedule is successfully registered (operation 810), the method can proceed to operation 830, which can include the WLAN access point sending a response acknowledging that the absence schedule has been successfully registered.

In some example embodiments, the absence control module 218 can be configured to delay leaving for the operating channel for a scheduled absence period in the event that the WLAN station 102 starts to receive a frame sent by the WLAN access point 106 in advance of a scheduled start of a scheduled absence period that will not be completely received by the WLAN station 102 until after the scheduled start of the absence period. In this regard, the WLAN station 102 can remain on the operating channel until after the frame has been completely received in such example embodiments.

Figure 9:
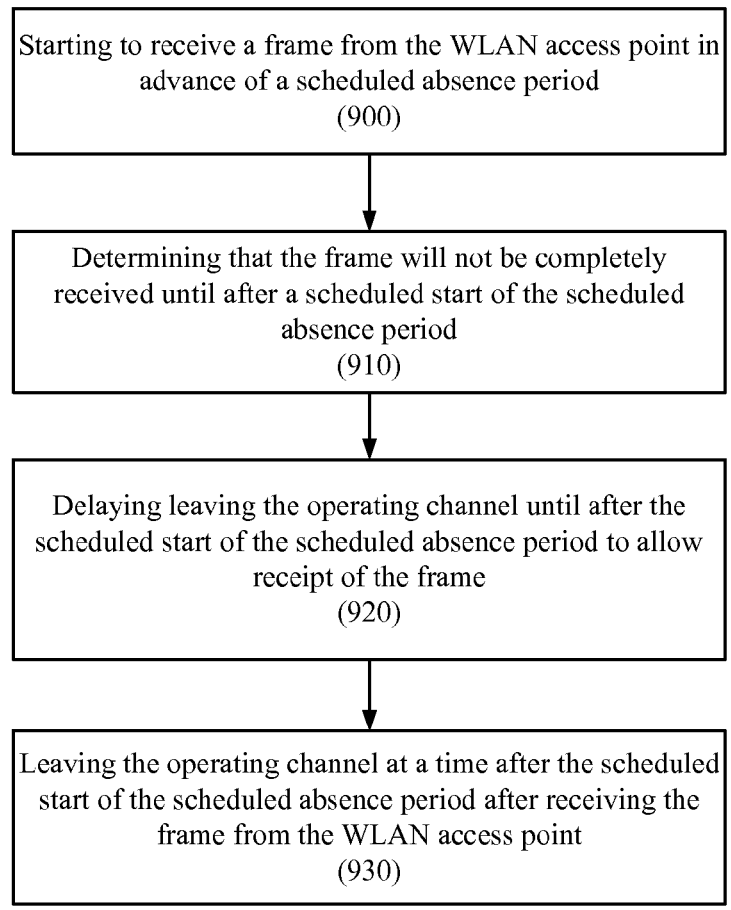
FIG. 9 illustrates a flowchart according to an example method for delaying a scheduled absence period to allow receipt of a frame according to some example embodiments.

FIG. 9 illustrates a flowchart according to an example method for delaying a scheduled absence period to allow receipt of a frame according to some example embodiments. In this regard, FIG. 9 illustrates operations that can be performed at a WLAN station, such as the WLAN station 102, in accordance with some example embodiments. One or more of the processing circuitry 210, processor 212, memory 214, communication interface 216, or absence control module 218 can, for example, provide means for performing the operations illustrated in FIG. 9. Operation 900 can include a WLAN station (e.g., the WLAN station 102) starting to receive a frame from the WLAN access point (e.g., the WLAN access point 106) in advance of a scheduled absence period. Operation 910 can include the WLAN station determining that the frame will not be completely received until after a scheduled start of the scheduled absence period. Operation 920 can include the WLAN station delaying leaving the operating channel until after the scheduled start of the scheduled absence period to allow receipt of the frame. Operation 930 can include the WLAN station leaving the operating channel at a time after the scheduled start of the scheduled absence period after receiving the frame from the WLAN access point.

In some example embodiments, the traffic control module 318 can be configured to determine when beginning to form a frame for the WLAN station 102 whether the frame will be completely received by the WLAN station 102 before the WLAN station 102 is scheduled to begin an absence period. In an instance in which the traffic control module 318 of such embodiments determines that a frame at least partially queued for the WLAN station 102 before the start of an absence period will not be completely received by the WLAN station 102 before the absence period, the traffic control module 318 can buffer the frame at least until conclusion of the absence period to avoid the potential for lost data.

Figure 10:
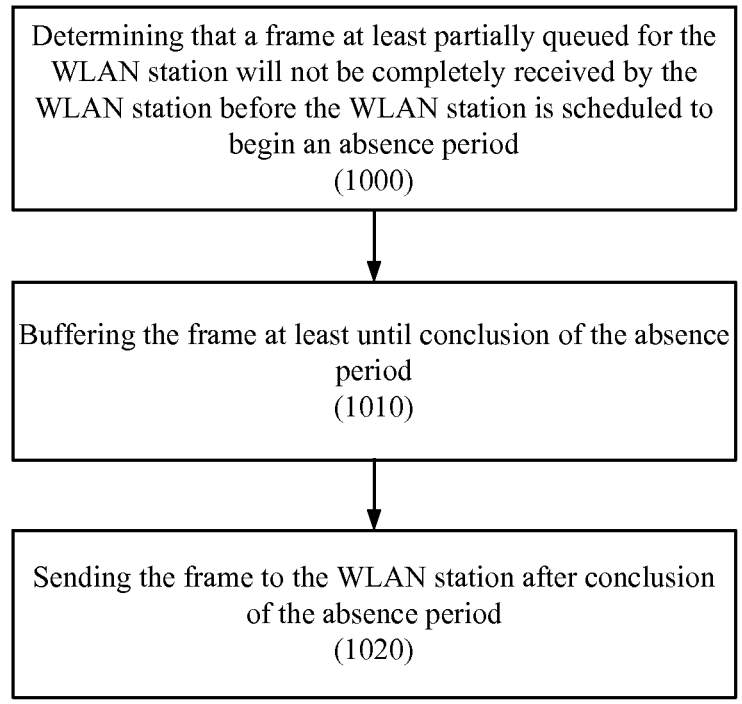
FIG. 10 illustrates a flowchart according to an example method for delaying sending a frame until after a scheduled absence period according to some example embodiments.

FIG. 10 illustrates a flowchart according to an example method for delaying sending a frame until after a scheduled absence period according to some example embodiments. In this regard, FIG. 10 illustrates operations that can be performed at a WLAN access point, such as the WLAN access point 106, in accordance with some example embodiments. One or more of the processing circuitry 310, processor 312, memory 314, communication interface 316, or traffic control module 318 can, for example, provide means for performing the operations illustrated in FIG. 10. Operation 1000 can include a WLAN access point (e.g., the WLAN access point 106) determining that a frame at least partially queued for the WLAN station will not be completely received by the WLAN station before the WLAN station is scheduled to begin an absence period. Operation 1010 can include the WLAN access point buffering the frame at least until conclusion of the absence period. Operation 1020 can include the WLAN access point sending the frame to the WLAN station after conclusion of the absence period. In this regard, transmission of the frame can commence after the WLAN station has returned to the operating channel from the absence period.

It will be appreciated that while various disclosed embodiments have been described in terms of WLAN access points and WLAN stations, embodiments are not limited to application within structured WLAN networks including an access point (AP). In this regard, the disclosed ideas can also be implemented, mutatis mutandis, to support scheduled absence between two non-AP WLAN stations that may be operating in an ad hoc mode and/or in any type of peer-to-peer WLAN-based scenario. Further, while the disclosure describes various example embodiments being applied to WLAN technology, it will be appreciated that the disclosed techniques can also be applied, mutatis mutandis, to any type of wireless communication technology, including, for example, cellular communications, Bluetooth, Zigbee, Wi-Max, and/or other wireless communication technology.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for scheduling absence periods on a wireless local area network (WLAN), the method comprising a WLAN station:
   joining a WLAN served by a WLAN access point using an operating channel;
   formatting a message defining an absence schedule of absence periods during which the WLAN station will be off of the operating channel and unavailable to receive traffic on the operating channel;
   sending the message to the WLAN access point to register the absence schedule with the WLAN access point; and leaving and returning to the operating channel in accordance with the absence schedule after the absence schedule has been registered with the WLAN access point.

2. The method of claim 1, wherein the absence schedule comprises a series of periodically occurring absence periods, the message defining a schedule start time at which a first absence period will begin, an absence period duration, and an interval between absence periods.

3. The method of claim 1, wherein the message is one of an action frame or a management frame including an information element defining the absence schedule.

4. The method of claim 1, further comprising the WLAN station:
receiving traffic buffered by the WLAN access point during an absence period after returning to the operating channel from the absence period.

5. The method of claim 1, further comprising the WLAN station:
receiving a response from the WLAN access point acknowledging that the absence schedule has been successfully registered prior to leaving and returning to the operating channel in accordance with the absence schedule;
wherein, in an instance in which an acknowledgement that the absence schedule has been successfully registered is not received from the WLAN access point, the method comprises the WLAN station reattempting to inform the WLAN access point of at least one absence period within the absence schedule before leaving the operating channel.

6. The method of claim 1, further comprising the WLAN station:
starting to receive a frame from the WLAN access point in advance of a scheduled absence period;
determining that the frame will not be completely received until after a scheduled start of the scheduled absence period;
delaying leaving the operating channel until after the scheduled start of the scheduled absence period to allow receipt of the frame; and
leaving the operating channel at a time after the scheduled start of the scheduled absence period after receiving the frame from the WLAN access point.

7. The method of claim 1, further comprising the WLAN station:
sending a message canceling the absence schedule to the WLAN access point.

8. The method of claim 1, wherein the absence periods are used by the WLAN station to scan another channel.

9. An apparatus comprising:
a communication interface configured to enable the apparatus to send data to and receive data from a wireless local area network (WLAN); and
processing circuitry coupled to the communication interface, wherein the processing circuitry is configured to control the apparatus to at least:
join a WLAN served by a WLAN access point using an operating channel;
format a message defining an absence schedule of absence periods during which the apparatus will be off of the operating channel and unavailable to receive traffic on the operating channel;
send the message to the WLAN access point to register the absence schedule with the WLAN access point; and
leave and return to the operating channel in accordance with the absence schedule after the absence schedule has been registered with the WLAN access point.

10. The apparatus of claim 9, wherein the absence schedule comprises a series of periodically occurring absence periods, the message defining a schedule start time at which a first absence period will begin, an absence period duration, and an interval between absence periods.

11. The apparatus of claim 9, wherein the message is one of an action frame or a management frame including an information element defining the absence schedule.

12. The apparatus of claim 9, wherein the processing circuitry is further configured to control the apparatus to:
receive traffic buffered by the WLAN access point during an absence period after returning to the operating channel from the absence period.

13. The apparatus of claim 9, wherein the processing circuitry is further configured to control the apparatus to:
start to receive a frame from the WLAN access point in advance of a scheduled absence period;
determine that the frame will not be completely received until after a scheduled start of the scheduled absence period;
delay leaving the operating channel until after the scheduled start of the scheduled absence period to allow receipt of the frame; and
leave the operating channel at a time after the scheduled start of the scheduled absence period after receiving the frame from the WLAN access point.

14. A method for scheduling absence periods on a wireless local area network (WLAN), the method comprising a WLAN access point:
receiving a message from a WLAN station defining an absence schedule of absence periods during which the WLAN station will be off of an operating channel used by the WLAN access point and unavailable to receive traffic on the operating channel;
buffering traffic to be sent to the WLAN station during an absence period defined by the absence schedule; and
sending buffered traffic to the WLAN station after conclusion of the absence period.

15. The method of claim 14, wherein the absence schedule comprises a series of periodically occurring absence periods, the message defining a schedule start time at which a first absence period will begin, an absence period duration, and an interval between absence periods.

16. The method of claim 14, wherein the message is one of an action frame or a management frame including an information element defining the absence schedule.

17. The method of claim 14, further comprising the WLAN access point:
sending a response acknowledging that the absence schedule has been successfully registered.

18. The method of claim 14, wherein buffering traffic to be sent to the WLAN station during an absence period comprises beginning to buffer traffic in advance of a scheduled start time of the absence period.

19. The method of claim 14, further comprising the WLAN access point:
determining that a frame at least partially queued for the WLAN station will not be completely received by the WLAN station before the WLAN station is scheduled to begin a scheduled absence period;
buffering the frame at least until conclusion of the scheduled absence period; and
sending the frame to the WLAN station after conclusion of the scheduled absence period.

20. An apparatus comprising:
a communication interface configured to enable the apparatus to send data to and receive data from a wireless local area network (WLAN); and
processing circuitry coupled to the communication interface, wherein the processing circuitry is configured to control the apparatus to at least:
use an operating channel to serve as a WLAN access point for the WLAN; receive a message from a WLAN station defining an absence schedule of absence periods during which the WLAN station will be off of the operating channel and unavailable to receive traffic on the operating channel;
buffer traffic to be sent to the WLAN station during an absence period defined by the absence schedule; and
send buffered traffic to the WLAN station after conclusion of the absence period.

21. The apparatus of claim 20, wherein the absence schedule comprises a series of periodically occurring absence periods, the message defining a schedule start time at which a first absence period will begin, an absence period duration, and an interval between absence periods.

22. The apparatus of claim 20, wherein the processing circuitry is further configured to control the apparatus to begin buffering traffic to be sent to the WLAN station during an absence period in advance of a scheduled start time of the absence period.

23. The apparatus of claim 22, wherein the processing circuitry is further configured to control the apparatus to begin buffering traffic at a time determined based at least in part on one or more of a size of a frame to be sent to the WLAN station or a network latency.

* * * * *